C. JOHNS.
METHOD OF PRODUCING FINISHED SECTIONS FROM IRON AND STEEL SCRAP.
APPLICATION FILED MAY 24, 1920.
1,425,971.                                         Patented Aug. 15, 1922.
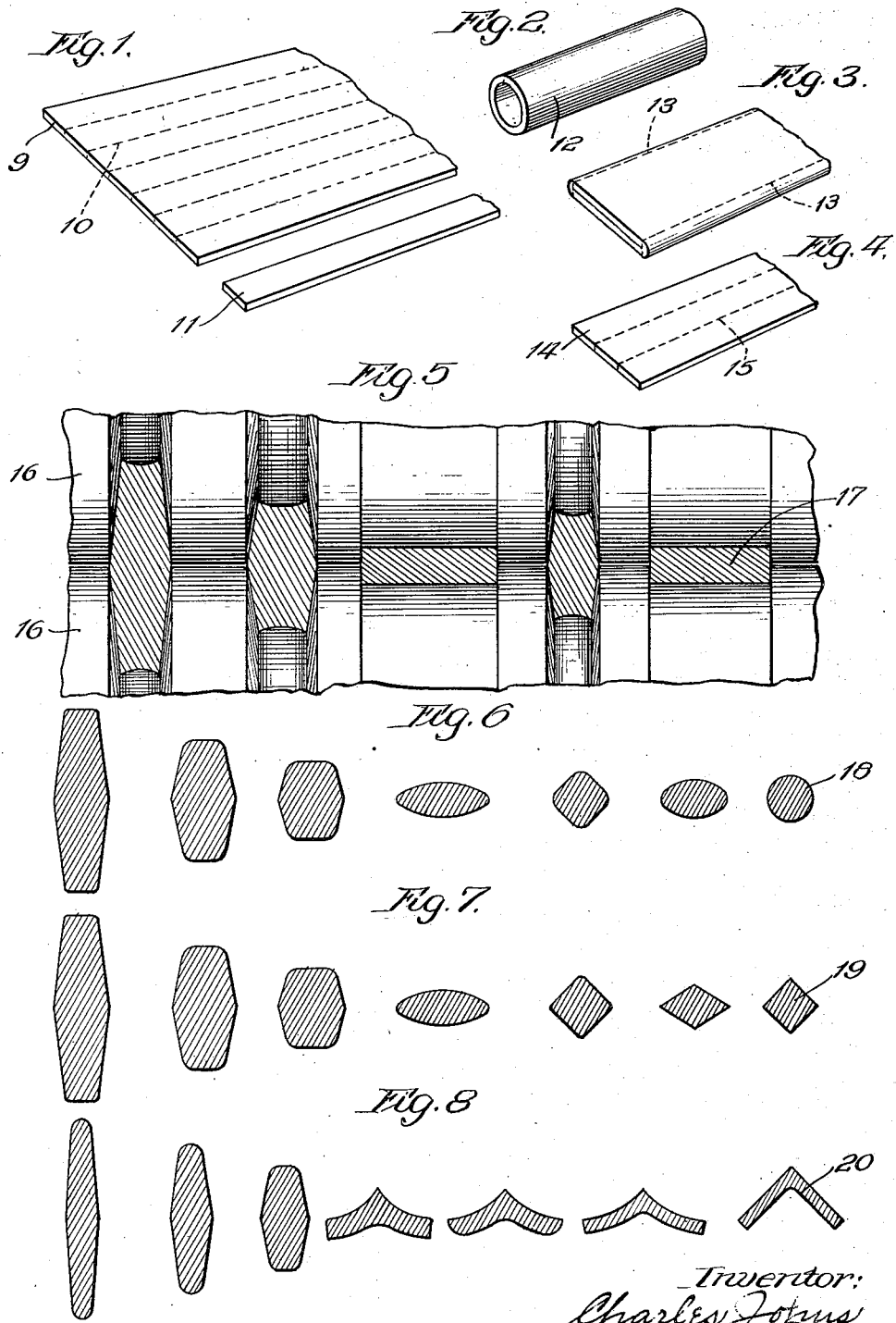

UNITED STATES PATENT OFFICE.

CHARLES JOHNS, OF CHICAGO, ILLINOIS.

METHOD OF PRODUCING FINISHED SECTIONS FROM IRON AND STEEL SCRAP.

1,425,971.

Specification of Letters Patent.  Patented Aug. 15, 1922.

Application filed May 24, 1920. Serial No. 383,895.

*To all whom it may concern:*

Be it known that I, CHARLES JOHNS, a citizen of the United States, residing at Chicago, in the county of Cook and State of Illinois, have invented certain new and useful Improvements in Methods of Producing Finished Sections from Iron and Steel Scrap, of which the following is a specification.

The object of this invention is to provide an improved method for quickly and economically producing finished sections by utilizing iron or steel scrap such as pipes, flues, tank and other plates and treating them in a novel manner without recourse to busheling, piling, faggoting, or melting.

In practicing my invention for the production of finished bars or strips I first produce strips of desired length and width from the scrap material. In case of plates this is accomplished by cutting the plates with shears, or a planer, or any other suitable means. In the case of pipes and flues I may first flatten them by cold rolling, by heating and rolling, by hammering, or in any other suitable way, and then cut them into strips. The cutting operation will remove the folded edges of the pipes and flues produced by the flattening operation and will separate the two superimposed layers into separate and independent strips of single thickness.

If the scrap lacks the weight or thickness desired in the finished section, I cut the strips with an excess width sufficient to provide the desired weight or thickness, or both. These strips are then heated sufficiently for the rolling operation and they are then rolled edgewise in a sufficient number of passes to produce billets of desired thickness and width. Then these billets are rolled in the usual way into rounds, flats, strips, angles or other desired sections.

For hot rolling I prefer to use strips made from pipe but for cold rolling I prefer to use strips made from flues, the latter being found in thin gauges and made of high grade material. The flue strips are cleaned by heating or pickling to remove dirt, rust and scale, after which they may be cold rolled into finished sections as above described. It will be understood, of course, that I may hot roll the flue strips and cold roll the pipe strips whenever these operations are to be preferred.

In the accompanying drawings I have illustrated the invention in a general way and referring thereto Fig. 1 is a perspective view of a plate 9 with dotted lines 10 indicating where it may be cut to form strips, one of the strips 11 being severed from the plate.

Fig. 2 illustrates a pipe 12 which is flattened as shown in Fig. 3 and which is cut on the broken line 13 to form two plates, one of which 14 is shown in Fig. 4 and is cut on the broken line 15 to form strips similar to the strip 11. The strips are rolled in suitable passes to obtain the desired section.

In Fig. 5 I have shown a pair of rolls 16—16 having a plurality of passes to roll a strip into a flat of a different width and thickness.

The work is shown in section in the several passes, as will be understood by those familiar with rolling metal, and it will be observed that the rolls themselves prevent the strip from bending and compel it to assume the shape of the pass in which it is traveling. The scale of Figs. 1-4 is much smaller than that of Figs. 5-8 but it will be understood that the sectioned members in the passes of Fig. 5 represent the form of the work as it is rolled in several passes to produce the flat 17.

Fig. 6 shows in section the several steps in rolling a round 18;

Fig. 7 shows in section the several steps in rolling a square 19; and

Fig. 8 shows in section the several steps in rolling an angle 20.

The drawings are merely illustrative and are intended to show how the invention may be practiced; they are not intended to indicate any arbitrary rolling method because it is appreciated that given the invention the rolling step may be performed in other ways than that disclosed in the drawings and some skilled in the art will prefer their own particular rolling methods which may be different more or less from those commonly employed. I regard the rolling plan outlined in the drawings as desirable and have found it works out very satisfactorily.

My invention provides a simple and novel method of producing merchant bars of all sections in an expeditious manner and at comparatively low cost. The invention is particularly valuable and important at the present time because of the difficulty of getting the large mills to fill orders for small sizes or small quantities. These mills are organized and equipped for large tonnage and while they have orders which will produce large tonnage they do not desire to make the necessary changes for producing such material as merchant iron or steel in small sections which, in a given time, will aggregate a comparatively small tonnage. And there exists the same reluctance to make changes to fill small orders, for the same reasons. It cannot be said that the mills are to be blamed for this situation because more or less disorganization and loss results from constant shifting from one form of production to another.

My invention avoids the difficulties of changing over from one production to another and particularly to the production of merchant iron and steel sections of small sizes and in small quantities in a large mill because I start with a partly finished material and provide a simple and inexpensive method of treating this scrap to form it quickly and economically into billets for rolling into desired sections. The invention eliminates a large number of operations which are necessary in a large mill for producing billets from pig metal and scrap. It also enables me to produce a great variety of sections and to fill small as well as large orders quickly and at low cost. It is my opinion that the invention will be more useful in treating pipe and flue scrap than plate scrap because there is comparatively little plate scrap available of suitable length for such treatment, but some tank plates may be treated in this way and other plates may be available. Scrap pipes and flues are to be found in considerable quantities and by reason of their length they are especially desirable for treatment in accordance with my invention. For some purposes it may not be necessaary to flatten and edge roll the strips because they may be cut to size and then cold rolled flat to finished section.

I claim:

1. The herein described method of producing finished sections from iron and steel scrap which consists in cutting the scrap into strips of excess width, rolling said strips edgewise to thicken the strips and reduce them to desired width, and then rolling the strips to desired section.

2. The herein described method of producing finished sections from scrap pipes or flues which consists in cutting the pipes or flues into strips and then cold rolling the strips edgewise and flatwise to desired section.

3. The herein described method of producing finished sections from metal strips, which consists in taking a strip of excess width rolling said strip edgewise to thicken the strip and reduce it to the desired width, and then rolling the strip to desired section.

CHARLES JOHNS.